(12) United States Patent
El Rifai

(10) Patent No.: US 7,805,207 B2
(45) Date of Patent: Sep. 28, 2010

(54) METHOD AND APPARATUS FOR ADAPTIVE PARALLEL PROPORTIONAL-INTEGRAL-DERIVATIVE CONTROLLER

(75) Inventor: Khalid El Rifai, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 418 days.

(21) Appl. No.: 12/057,814

(22) Filed: Mar. 28, 2008

(65) Prior Publication Data

US 2009/0248177 A1    Oct. 1, 2009

(51) Int. Cl.
*G05B 13/02*    (2006.01)
(52) U.S. Cl. ........................................ 700/42
(58) Field of Classification Search ................ 700/28, 700/37, 42, 44–46
See application file for complete search history.

(56) References Cited

U.S. PATENT DOCUMENTS

| | | | | |
|---|---|---|---|---|
| 4,925,312 | A * | 5/1990 | Onaga et al. | ................ 700/261 |
| 5,444,612 | A | 8/1995 | Torii et al. | |
| 5,687,077 | A | 11/1997 | Gough, Jr. | |
| 5,691,615 | A | 11/1997 | Kato et al. | |
| 6,055,524 | A | 4/2000 | Cheng | |
| 6,658,370 | B2 | 12/2003 | Christ et al. | |
| 7,706,899 | B2 * | 4/2010 | El Rifai | ....................... 700/42 |
| 2003/0195641 | A1 * | 10/2003 | Wojsznis et al. | .............. 700/42 |
| 2009/0118873 | A1 * | 5/2009 | Cheng et al. | ................ 700/296 |

OTHER PUBLICATIONS

Chang, W.-D., and J.-J Yan, "Adaptive robust PID controller design based on a sliding mode for uncertain chaotic systems," Chaos, Solitons and Fractals, 26, pp. 167-175, 2005.
Iwai, Z., Mizumoto, I., Liu, L.; Shah, S.L.; Jiang, H., "Adaptive Stable PID Controller with Parallel Feedforward Compensator," Conference on Control, Automation, Robotics and Vision, Dec. 2006.
Pirabakaran, K., and V. M. Bacerra, "Automatic Tuning of PID Controllers Using Model Reference Adaptive Control Techniques," Conference of the IEEE Industrial Electronics Society, Dec. 2001.
Xiong, A. and Y. Fan, "Application of a PID Controller using MRAC Techniques for Control of the DC Electromotor Drive," IEEE International Conference on Mechatronics and Automation, Aug. 2007.

* cited by examiner

*Primary Examiner*—Ramesh B Patel
*Assistant Examiner*—Chad Rapp
(74) *Attorney, Agent, or Firm*—Dirk Brinkman; Gene Vinokur

(57) ABSTRACT

An adaptive parallel proportional-integral-derivative controller produces a fixed controller output including a fixed proportional-integral-derivative and a fixed feedforward controller command, and an adaptive controller output including an adaptive parallel PID and an adaptive feedforward command all from a reference command. The fixed controller output and the adaptive controller output are added to produce a control command for a controlled system, which provides a measure of an output and a rate of change of the output as feedback for the controller.

19 Claims, 5 Drawing Sheets

100

METHOD AND APPARATUS FOR ADAPTIVE PARALLEL PROPORTIONAL-INTEGRAL-DERIVATIVE CONTROLLER

RELATED APPLICATION

This U.S. patent application is related to U.S. patent application Ser. No. 12/057,721, co-filed herewith, and incorporated herein by reference.

FIELD OF THE INVENTION

This invention relates generally to controlled systems, in particular, to real-time adaptive proportional-integral-derivative (PID) controllers.

BACKGROUND OF THE INVENTION

Many controlled systems use proportional-integral-derivative (PID) controllers. However, a performance and stability of these controlled systems is sensitive to system parameters, such as inertia or stiffness and selected PID gains.

Adaptive control is one possible method for improving the performance of these controlled systems. However, adaptive control usually requires detailed process models or an approximation of these models to estimate the system parameters.

For example, U.S. Pat. No. 5,444,612 and U.S. Pat. No. 5,691,615 describe motion controllers with adaptive control based on a motion system model to estimate and compensate for inertia, damping, friction, and gravity parameters and perform model-based adaptive control. U.S. Pat. No. 6,055,524 and U.S. Pat. No. 5,687,077 describe function approximation methods, such as neural networks and Laguerre functions, to approximate the system model and estimate the corresponding parameters. Other approaches, such as U.S. Pat. No. 6,658,370, and references therein, describe some type of adaptive control by using a finite set of pre-designed sets of tuning constants, and a method to determine which set of tuning constants are optimum. That approach requires that at least one set of pre-designed tuning constants yields acceptable performance for an unknown system in operation. Other types of PID controllers use rule based adjustment of controller gains, such as fuzzy logic conditions.

Related approaches are described for adaptive parallel PID by Chang, W.-D., and J.-J Yan, "Adaptive robust PID controller design based on a sliding mode for uncertain chaotic systems," *Chaos, Solitons and Fractals*, 26, pp. 167-175, 2005, Iwai, Z., Mizumoto, I., Liu, L.; Shah, S. L.; Jiang, H., "Adaptive Stable PID Controller with Parallel Feedforward Compensator," *Conference on Control, Automation, Robotics and Vision*, December, 2006, Pirabakaran, K., and V. M. Bacerra, "Automatic Tuning of PID Controllers Using Model Reference Adaptive Control Techniques," *Conference of the IEEE Industrial Electronics Society*, December, 2001, and Xiong, A. and Y. Fan, "Application of a PID Controller using MRAC Techniques for Control of the DC Electromotor Drive," *IEEE International Conference on Mechatronics and Automation*, August, 2007.

SUMMARY OF THE INVENTION

An adaptive parallel proportional-integral-derivative controller produces a fixed controller output including a fixed proportional-integral-derivative and a fixed feedforward controller command, and an adaptive controller output including an adaptive parallel PID and an adaptive feedforward command all from a reference command.

The fixed controller output and the adaptive controller output are added to produce a control command for a controlled system, which provides a measure of an output and a rate of change of the output as feedback for the controller.

DETAILED DESCRIPTION OF THE PREFERRED EMBODIMENTS

Figure 1:
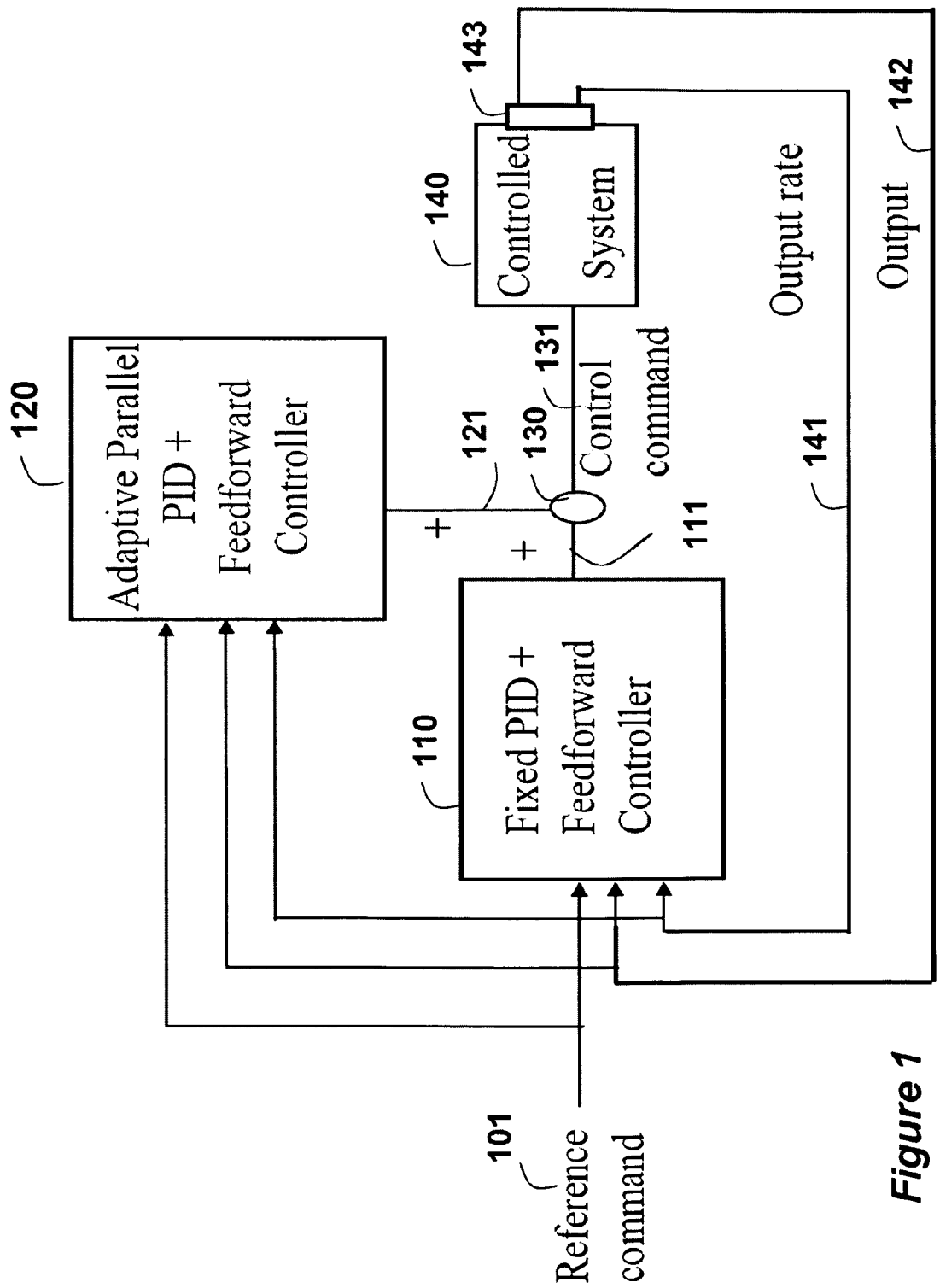
FIG. 1 is a block diagram of an adaptive PID controller according to an embodiment of the invention.

As shown in FIG. 1, the embodiments of the invention provide an apparatus and method 100 for adaptive proportional-integral-derivative (PID) control with feedforward control. The method and apparatus comprise a fixed controller 110 and an adaptive controller 120. The fixed controller includes a fixed PID controller, and a fixed feedforward controller. The adaptive controller includes an adaptive parallel controller 120 and an adaptive feedforward controller.

Input to the fixed and adaptive controllers is a reference command r 101. An output of the fixed controller is a fixed PID and a fixed feedforward 111. An output 121 of the adaptive parallel controller 120 is an adaptive parallel PID 123 and an adaptive feedforward 122, see FIG. 2-4, which in combination form an adaptive parallel control command $u_{adapt}$ 121.

The fixed output 111 and the adaptive output are added 130 to form a control command u 131 for a controlled system 140. The controlled system can provide a measure of an output y 141 and a rate of change 142 of the output 141, using some sensing or approximation means 143, which are fed back to the fixed and adaptive parallel controllers. The controlled system can be any system as known in the art.

The controlled system 140 can be of dominant order n, with n=1 for first order dominant processes, such as most temperature or velocity controlled systems and n=2 for second order dominant processes, such as most position controlled systems. In the preferred embodiment, n≦2, because most controlled systems have dominant first and second order dynamics.

The following equalities are defined:

$$z = -(d/dt + K_{pp})^{n-1} e$$

$$z_I = \int z \, dt$$

where t is time, $K_{pp}>0$ is a selected scalar gain, e=r−y is a tracking error for the reference command r 101, and y is the output.

The control command u 131 for the preferred embodiment is $$u = K_p z + K_{Iv} z_I + K_{ff} w_{ff} + u_{adapt} \tag{1a}$$

$$u_{adapt} = \hat{K}_{ff} w_{ff} + u_a \tag{1b}$$

where $K_{pv}>0$ is a fixed proportional gain, $K_{iv}>0$ is a fixed integral gain, $K_{ff}$ is a fixed feedforward gain. The adaptive parallel control command $u_{adapt}$ 121 includes an adaptive parallel PID command $u_a$ and an adaptive feedforward command $\hat{K}_{ff}w_{ff}$. The fixed and adaptive feedforward gains $K_{ff}$ and $\hat{K}_{ff}$, respectively are multiplied by a combined feedforward and feedback signal $w_{ff}=y^{(n)}-\dot{z}$.

For n=1, the fixed controller is a PI controller, and signal $w_{ff}=\dot{r}$. For n=2, the fixed controller is a PID controller, and the signal $w_{ff}=\ddot{r}+K_{pp}\dot{e}$. The (.) and (..) superscripts of the variables denote first and second derivatives with respect to time.

The adaptive feedforward gain $\hat{K}_{ff}$ is updated according to:

$$\dot{\hat{K}}_{ff}=-\gamma_{ff}w_{ff}z-L_{ff}\hat{K}_{ff} \quad (2)$$

where $\gamma_{ff}>0$ is an adaptation gain for the adaptive feedforward gain, and $L_{ff}\geq 0$ is a filter gain.

The adaptive parallel PID control command $u_a$ and a method for updating the adaptive gains depends on the embodiment of the adaptive parallel PID controller, as described below for different parallel PID embodiments.

Parallel PID Controller

Figure 2:
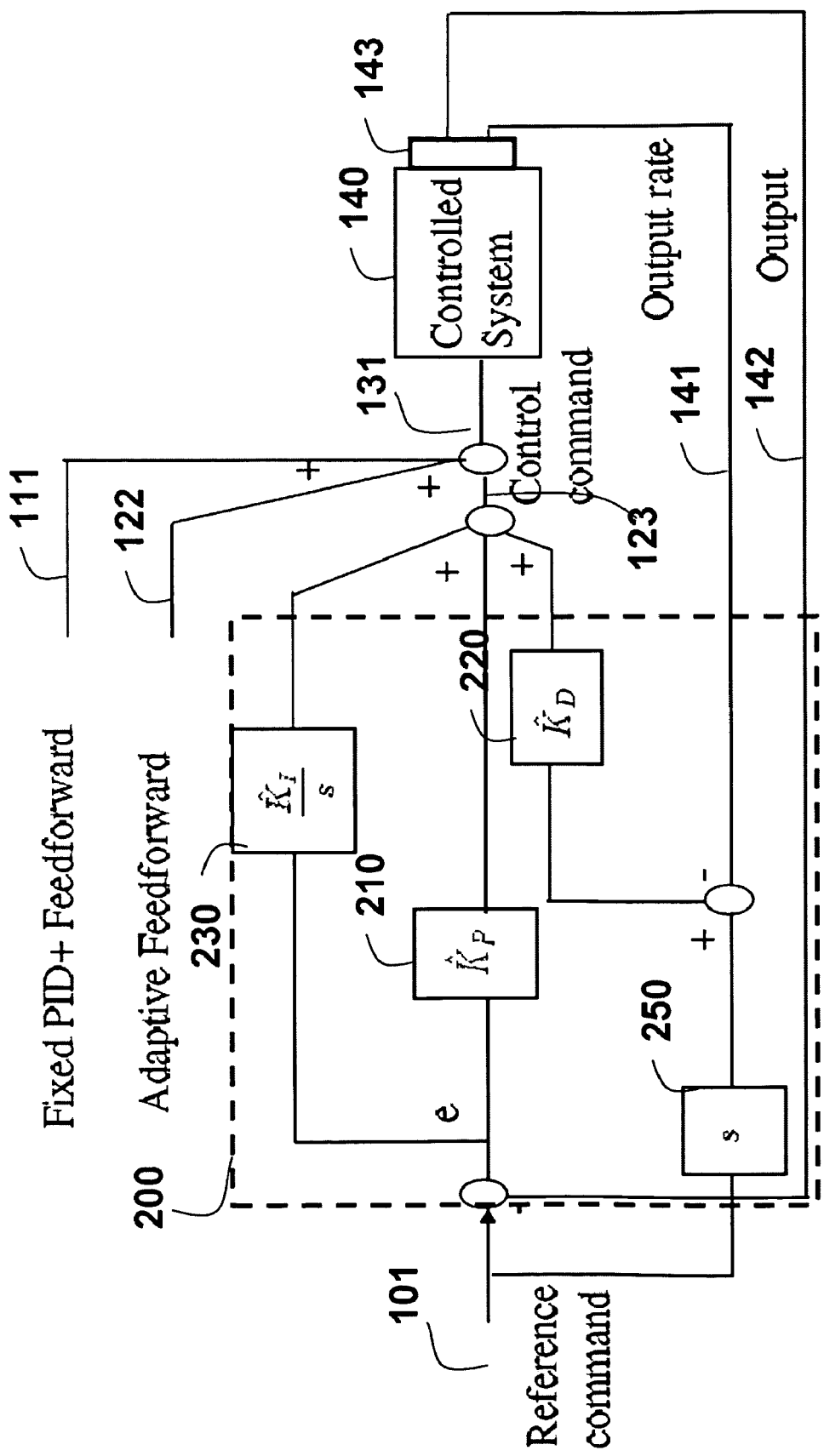
FIG. 2 is a block diagram of an adaptive parallel PID controller according to an embodiment of the invention.

FIG. 2 shows the adaptive parallel PID controller 120 in greater detail. The adaptive parallel PID command $u_a$ 123 is $$u_a=\hat{K}_P e+\hat{K}_D \dot{e}+\hat{K}_I \int e dt, \quad (3)$$

where $\hat{K}_P$ 210 is an adaptive proportional gain, $\hat{K}_D$ 220 is an adaptive derivative gain, $\hat{K}_I$ 230 is an adaptive integral gain. The module 250 is a differentiator, in which s is a Laplace variable.

The adaptive gains for Equation (3) are updated according to $$\dot{\hat{K}}_P=-\gamma_P ez-L_P\hat{K}_P \quad (4)$$

$$\dot{\hat{K}}_D=-\gamma_D \dot{e}z-L_D\hat{K}_D \quad (5)$$

$$\dot{\hat{K}}_I=-\gamma_I \int e dt z-L_I\hat{K}_I, \quad (6)$$

where $\gamma_P, \gamma_D, \gamma_I>0$ are adaptation gains for proportional, derivative, and integral gains, respectively. In addition, $L_P$, $L_D$, $L_I\geq 0$ are the filter gains used to adjust adaptation response for the adaptive PID gains. Therefore, the overall design of the adaptive parallel PID and feedforward controller 100 is given by Equations (1)-(6) in this embodiment with the adaptive parallel PID controller as shown in FIG. 2.

Figure 3:
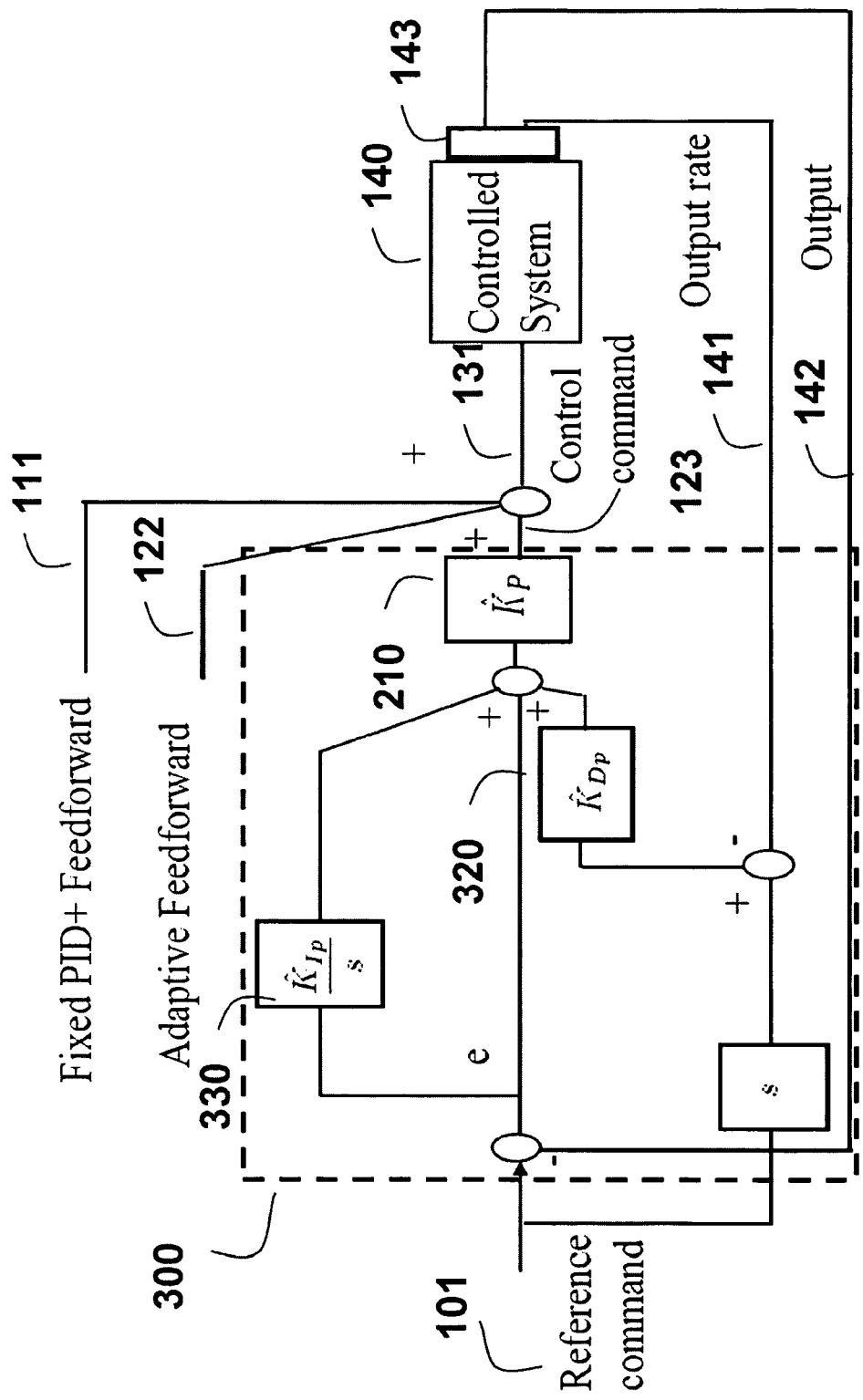
FIG. 3 is a block diagram of an adaptive parallel PID controller with overall proportional gain according to an embodiment of the invention.

FIG. 3 shows an adaptive parallel controller 300 with overall proportional gain. In this embodiment, the adaptive parallel PID control command is:

$$u_a=\hat{K}_P(e+\hat{K}_{Dp}\dot{e}+\hat{K}_{Ip}\int e dt) \quad (7)$$

where $\hat{K}_P$ 210 is the adaptive proportional gain, $\hat{K}_{Dp}$ 320 is an adaptive derivative gain scaled by the adaptive proportional gain, $K_{Ip}$ 330 is an adaptive integral gain scaled by the adaptive proportional gain.

The adaptive gains for the adaptive PID of Equation (7) are updated according to $$\dot{\hat{K}}_P = -\gamma_P\left(e+\frac{\hat{K}_{Dp}}{2}\dot{e}+\frac{\hat{K}_{Ip}}{2}\int e dt\right)z - L_P\hat{K}_P \quad (8)$$

$$\dot{\hat{K}}_{Dp} = -\gamma_D \frac{\hat{K}_P}{2}\dot{e}z - L_{Dp}\hat{K}_{Dp} \quad (9)$$

$$\dot{\hat{K}}_{Ip} = -\gamma_I \frac{\hat{K}_P}{2}\int e dt z - L_{Ip}\hat{K}_{Ip} \quad (10)$$

where $\gamma_P, \gamma_{Dp}, \gamma_{Ip}>0$ are the adaptation gains for proportional, derivative, and integral gains, respectively. In addition, $L_P$, $L_{Dp}, L_{Ip}\geq$ are the filter gains used to an adjust adaptation response for the adaptive PID gains. Therefore, the overall design of the adaptive parallel PID and feedforward controller 100 is given by Equations (1), (2), (7) and, (8)-(10) in this embodiment with the adaptive parallel PID controller according to FIG. 3.

Parallel PID Controller with Overall Derivative Gain

Figure 4:
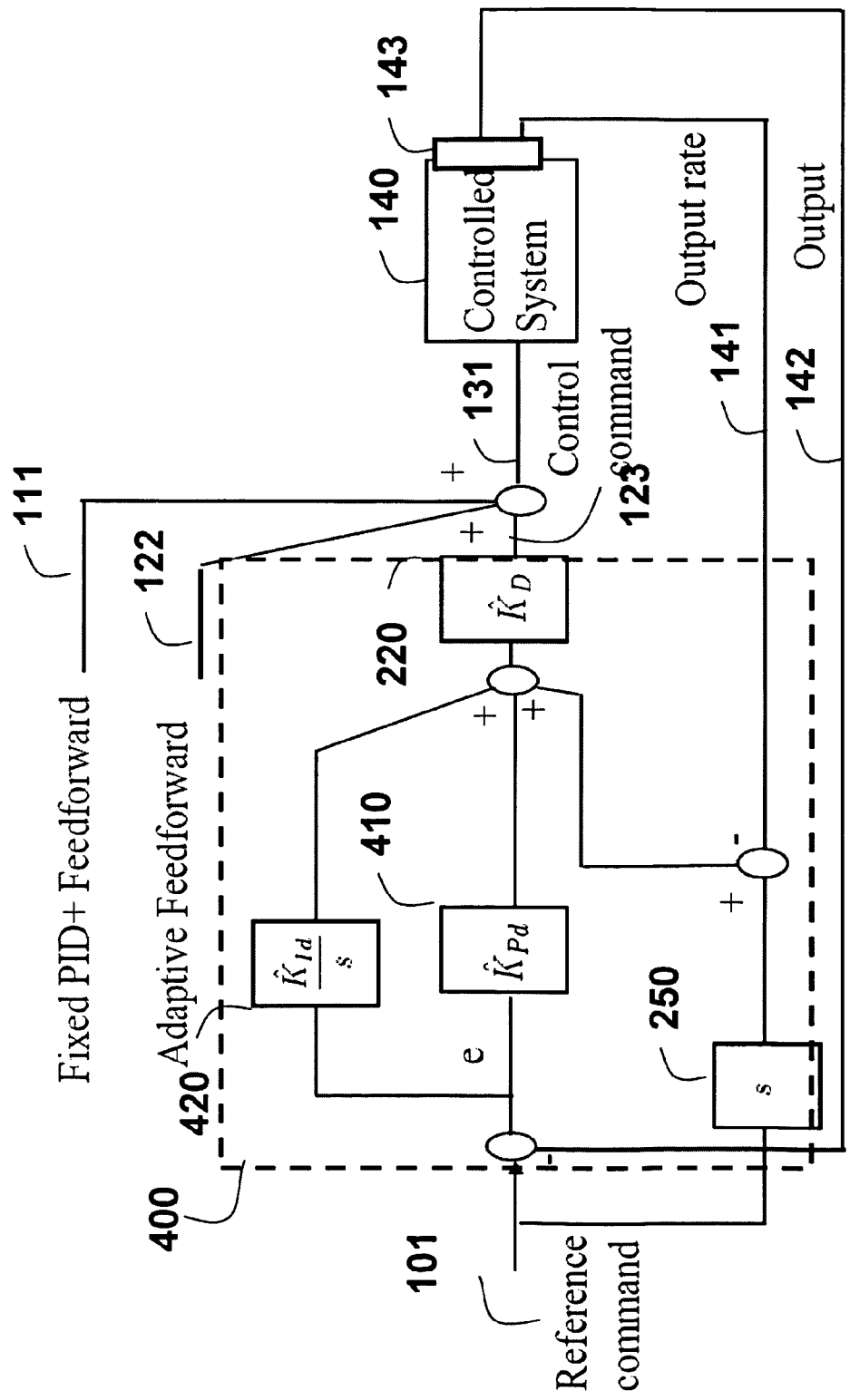
FIG. 4 is a block diagram of an adaptive parallel PID controller with overall derivative gain according to an embodiment of the invention.

FIG. 4 shows an adaptive parallel controller 400 with overall derivative gain. In this embodiment, the adaptive parallel PID control command is $$u_a=\hat{K}_D(\dot{e}+\hat{K}_{Pd}e+\hat{K}_{Id}\int e dt), \quad (11)$$

where $\hat{K}_D$ 220 is the adaptive derivative gain, $\hat{K}_{Pd}$ 410 is an adaptive proportional gain scaled by the adaptive the derivative gain, and $\hat{K}_{Id}$ 420 is an adaptive integral gain scaled by the adaptive derivative gain.

The adaptive gains for the adaptive PID of Equation (11) are updated according to $$\dot{\hat{K}}_{Pd} = -\gamma_{Pd}\frac{\hat{K}_D}{2}ez - L_{Pd}\hat{K}_{Pd} \quad (12)$$

$$\dot{\hat{K}}_D = -\gamma_D\left(\dot{e}+\frac{\hat{K}_{Pd}}{2}e+\frac{\hat{K}_{Id}}{2}\int e dt\right)z - L_D\hat{K}_D \quad (13)$$

$$\dot{\hat{K}}_{Id} = -\gamma_I \frac{\hat{K}_D}{2}\int e dt z - L_{Id}\hat{K}_{Id} \quad (14)$$

where $\gamma_{Pd}, \gamma_D, \gamma_{Id}>0$ are adaptation gains for proportional, derivative, and integral gains, respectively. In addition, $L_{Pd}$, $L_D, L_{Id}\geq$ are filter gains used to adjust adaptation response for adaptive PID gains. Therefore, the overall design of the adaptive parallel PID and feedforward controller 100 is given by Equations (1), (2), (11) and, (12)-(14) in this embodiment with the adaptive parallel PID controller according to FIG. 4.

Parallel PID Controller with Overall Integral Gain

Figure 5:
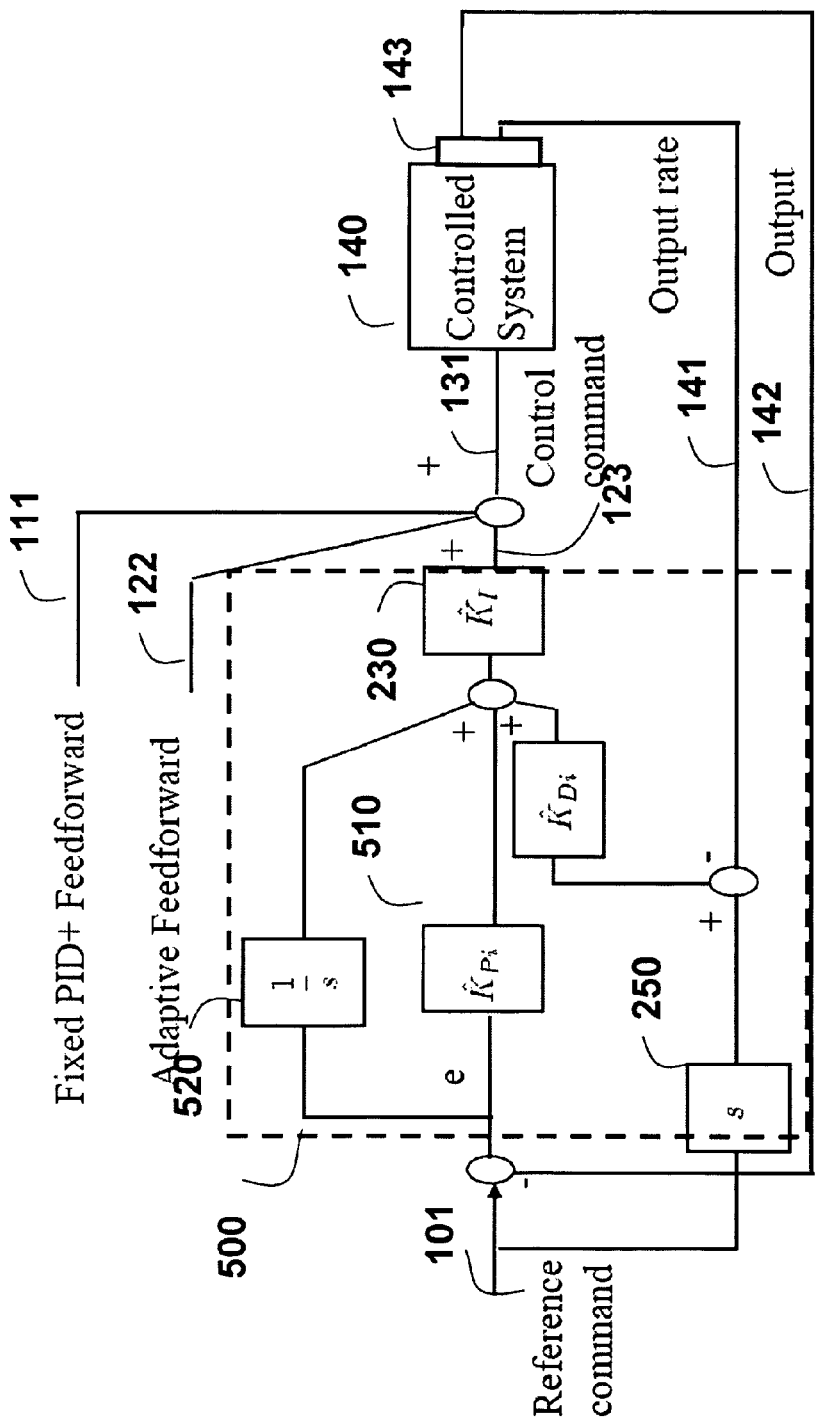
FIG. 5 is a block diagram of an adaptive parallel PID controller with overall integral gain according to an embodiment of the invention.

FIG. 5 shows an adaptive parallel controller 500 with overall integral gain. In this embodiment, the adaptive parallel PID control command is $$u_a=\hat{K}_I(\int e dt+\hat{K}_{Pi}e+\hat{K}_{Di}\dot{e}) \quad (15)$$

where $\hat{K}_I$ 230 is an adaptive integral gain, $\hat{K}_{Di}$ 520 is an adaptive derivative gain scaled by the adaptive integral gain, $\hat{K}_{Pi}$ 510 is an adaptive proportional gain scaled by the adaptive integral gain. The adaptive gains for the adaptive PID of Equation (15) are updated according to $$\dot{\hat{K}}_{Pi} = -\gamma_{Pi}\frac{\hat{K}_I}{2}ez - L_{Pi}\hat{K}_{Pi} \quad (16)$$

$$\dot{\hat{K}}_{Di} = -\gamma_{Di}\frac{\hat{K}_I}{2}\dot{e}z - L_{Di}\hat{K}_{Di} \quad (17)$$

-continued $$\dot{\hat{K}}_I = -\gamma_I \left( \int e \, dt + \frac{\hat{K}_{Pi}}{2} e + \frac{\hat{K}_{Di}}{2} \dot{e} \right) z - L_I \hat{K}_I \quad (18)$$

where $\gamma_P$, $\gamma_D$, $\gamma_I > 0$ are adaptation gains for proportional, derivative, and integral gains, respectively. In addition, $L_{Pi}$, $L_{Di}$, $L_I \geq$ are filter gains used to adjust adaptation response for the adaptive gains. Therefore, the overall design of the adaptive parallel PID and feedforward controller 100 is given by Equations (1), (2), (15) and, (16)-(18) in this embodiment with the adaptive parallel PID controller according to FIG. 5.

Design Considerations

For a class of controlled systems:

$$a y^{(n)} = u, \quad (19)$$

where $y^{(n)}$ is the $n_{th}$ derivative of the output y, where n is a dominant order of the system. An unknown constant parameter $a > 0$ is a high frequency gain. The Equations (1)-(2) are substituted into Equation (19), which yields $$a\dot{z} = -K_{pu}z - K_{iu}z_I + \tilde{K}_{ff} w_{ff} + u_a$$

where $$\tilde{K}_{ff} = \hat{K}_{ff} - a + K_{ff}$$

is a feedforward gain estimation error. Consider the Lyapunov potential function $$V = az^2 + K_{iu}z_I^2 + \gamma_{ff}^{-1}\tilde{K}_{ff}^2 + \hat{K}'\Gamma^{-1}\hat{K},$$

where $\hat{K}$ is a three element vector including the three adaptive PID gains for any of the embodiments described above, and $\Gamma$ is the diagonal adaptation gain matrix including the adaptation gains, such as $\gamma_P$, $\gamma_D$, and $\gamma_I$ for the embodiment according to Equation (3), and so on.

The design of the adaptive controller is based on obtaining negativity of the function derivative $\dot{V}$. Determining $\dot{V}$ yields $$\dot{V} = -K_{pu}z^2 + zu_a + \hat{K}'\Gamma^{-1}\dot{\hat{K}}.$$

Using the formula for the adaptive PID control command in Equation (3), and the corresponding adaptation Equations (4)-(6) for $\dot{V} \leq 0$, and substituting into the above equation for $\dot{V}$ shows that $\dot{V} \leq 0$ and thus proves system stability.

The same procedure can be repeated for the three other adaptive PID embodiments in Equations (7), (11), and (15), and their corresponding adaptation Equations to prove stability of the system with $\dot{V} \leq 0$ according to the Lyapunov stability theory. The adaptation Equations used to update the gains are obtained using the approach described above.

In particular, a general formulation for updating the adaptation gain vector $\hat{K}$ including adaptive PID gains associated with the adaptive PID command $u_a$, is $$u_a(\hat{K}, t) = u_a(0, t) + \hat{K}' \nabla u_a(0, t) + \frac{1}{2} \hat{K}' \nabla^2 u_a \hat{K},$$

where $u_a(\hat{K}, e, \dot{e}, \int e)$ is denoted by $u_a(\hat{K}, t)$, and $\nabla u_a(0, t)$ is the gradient, i.e., the first order derivative, of the adaptive PID control command $u_a$ with respect to $\hat{K}$ and evaluated at $\hat{K} = 0$. $\nabla^2 u_a$ is the Hessian or second order derivative of $u_a$ with respect to $\hat{K}$, which is independent of $\hat{K}$ in this case. The above formula is obtained by using an exact second order Taylor expansion of $u_a$.

EFFECT OF THE INVENTION

The invention provides adaptive PID controller and method for dynamically adjusting adaptive PID gains for parallel PID with coupled gain adaptation using output and output rate feedback signals and a reference command. The invention can operate without using detailed process models or their approximation for parameter estimation, or predetermined gain values as in most conventional PID controllers. The embodiments of the invention can use an overall proportional gain or overall integral gain. The adaptive PID controller can be used to compensate for possibly unknown and varying system parameters such as stiffness and inertia of a controlled system.

Although the invention has been described with reference to certain preferred embodiments, it is to be understood that various other adaptations and modifications can be made within the spirit and scope of the invention. Therefore, it is the object of the append claims to cover all such variations and modifications as come within the true spirit and scope of the invention.

I claim:

1. An apparatus for controlling a system, comprising:
   a fixed controller comprising:
      a fixed proportional-integral-derivative (PID) controller; and
      a fixed feedforward controller, in which the fixed PID controller and the fixed feedforward controller are configured to receive a reference command and to produce a fixed controller output comprising a fixed PID and a fixed feedforward controller command;
   an adaptive parallel controller comprising:
      an adaptive parallel PID controller; and
      an adaptive feedforward controller, in which the adaptive parallel PID controller and the adaptive feedforward controller are configured to receive the reference command and to produce adaptive controller output comprising an adaptive parallel PID and an adaptive feedforward; and
   means for adding the fixed controller output and the adaptive parallel controller output to produce a control command for a controlled system, the controlled system providing a measure of an output and a rate of change of the output as feedback to the fixed controller and the adaptive controller, in which gains of the adaptive parallel controller and the adaptive feedforward controller are adjusted dynamically.

2. The apparatus of claim 1, in which the controlled system has a dominant order n, with n=1 for first order dominant process, wherein the first order dominant process is a velocity controlled system.

3. The apparatus of claim 1, in which the controlled system has a dominant order n, with n=2 for second order dominant process, wherein the second order process is a position controlled system.

4. The apparatus of claim 1, in which $$z = -(d/dt + K_{pp})^{n-1} e$$

$$z_I = \int z \, dt$$

where t is time, $K_{pp} > 0$ is a selected scalar gain, $e = r - y$ is a tracking error for the reference command r, and y is the output.

5. The apparatus of claim 4, in which the control command is $$u = K_{pu}z + K_{iu}z_I + K_{ff} w_{ff} + u_{adapt}$$

$$u_{adapt} = \hat{K}_{ff} w_{ff} + u_a$$

where $K_{pv}>0$ is a fixed proportional gain, $K_{iv}>0$ is a fixed integral gain, $K_{ff}$ is a fixed feedforward gain, and an adaptive parallel control command $u_{adapt}$ includes an adaptive parallel PID command $u_a$ and an adaptive feedforward command $\hat{K}_{ff}w_{ff}$, and the fixed feedforward gain $K_{ff}$ and the adaptive feedforward gain $\hat{K}_{ff}$ are multiplied by a combined feedforward and feedback signal $w_{ff}=y^{(n)}-\dot{z}$.

6. The apparatus of claim 5, in which the controlled system has a dominant order n=1 for first order dominant processes, and the fixed controller is a PI controller, and $w_{ff}=\dot{r}$, where a superscript (.) on the variable r denote a first derivative with respect to time t.

7. The apparatus of claim 5, in which the controlled system has a dominant order n=2 for second order dominant processes, and the fixed controller is a PID controller, and $w_{ff}=\ddot{r}+K_{pp}\dot{e}$, where a superscript (..) on the variable r denote a second derivative with respect to time t.

8. The apparatus of claim 5, in which the adaptive feedforward gain $\hat{K}_{ff}$ is updated according to:

$$\dot{\hat{K}}_{ff}=-\gamma_{ff}w_{ff}z-L_{ff}\hat{K}_{ff},$$

where $\gamma_{ff}>0$ is an adaptation gain for the adaptive feedforward gain, and $L_{ff}\geq 0$ is a filter gain.

9. The apparatus of claim 5, in which the adaptive parallel PID control command $u_a$ is $$u_a=\hat{K}_Pe+\hat{K}_D\dot{e}+\hat{K}_I\int edt,$$

where $\hat{K}_P$ is an adaptive proportional gain, $\hat{K}_D$ is an adaptive derivative gain, $\hat{K}_I$ is an adaptive integral gain. The module 250 is a differentiator, in which s is a Laplace variable.

10. The apparatus of claim 9, in which adaptive gains of the adaptive parallel PID control command are updated according to $$\dot{\hat{K}}_P = -\gamma_P e z - L_P \hat{K}_P$$

$$\dot{\hat{K}}_D = -\gamma_D \dot{e} z - L_D \hat{K}_D$$

$$\dot{\hat{K}}_I = -\gamma_I \int edt z - L_I \hat{K}_I,$$

where $\gamma_P, \gamma_D, \gamma_I>0$ are adaptation gains for proportional, derivative, and integral gains, respectively and $L_P, L_D, L_I\geq 0$ are filter gains used to adjust an adaptation response for adaptive PID gains.

11. The apparatus of claim 5, in which the adaptive parallel PID control command is $$u_a=\hat{K}(e+\hat{K}_{Dp}\dot{e}+\hat{K}_{Ip}\int edt),$$

where $\hat{K}_P$ is an adaptive proportional gain, $\hat{K}_{Dp}$ is an adaptive derivative gain scaled by the adaptive proportional gain, $K_{Ip}$ is an adaptive integral gain scaled by the adaptive proportional gain.

12. The apparatus of claim 11, in which adaptive gains of the adaptive parallel PID control command are updated according to $$\dot{\hat{K}}_P = -\gamma_P \left( e + \frac{\hat{K}_{Dp}}{2}\dot{e} + \frac{\hat{K}_{Ip}}{2}\int edt \right) z - L_P \hat{K}_P$$

$$\dot{\hat{K}}_{Dp} = -\gamma_D \frac{\hat{K}_P}{2}\dot{e}z - L_{Dp}\hat{K}_{Dp}$$

$$\dot{\hat{K}}_{Ip} = -\gamma_I \frac{\hat{K}_P}{2}\int edt z - L_{Ip}\hat{K}_{Ip},$$

where $\gamma_P, \gamma_{Dp}, \gamma_{Ip}>0$ are adaptation gains for proportional, derivative, and integral gains, respectively and $L_P, L_{Dp}, L_{Ip}\geq$ are the filter gains used to adjust an adaptation response for the adaptive PID gains.

13. The apparatus of claim 6, in which the adaptive parallel PID control command is $$u_a=\hat{K}_D(\dot{e}+\hat{K}_{Pd}e+\hat{K}_{Id}\int edt),$$

where $\hat{K}_D$ is an adaptive derivative gain, $\hat{K}_{Pd}$ is an adaptive proportional gain scaled by the adaptive the derivative gain, and $\hat{K}_{Id}$ 420 is an adaptive integral gain scaled by the adaptive derivative gain.

14. The apparatus of claim 13, in which the adaptive gains are updated according to $$\dot{\hat{K}}_{Pd} = -\gamma_{Pd}\frac{\hat{K}_D}{2}ez - L_{Pd}\hat{K}_{Pd}$$

$$\dot{\hat{K}}_D = -\gamma_D\left(\dot{e} + \frac{\hat{K}_{Pd}}{2}e + \frac{\hat{K}_{Id}}{2}\int edt\right)z - L_D\hat{K}_D$$

$$\dot{\hat{K}}_{Id} = -\gamma_I\frac{\hat{K}_D}{2}\int edt z - L_{Id}\hat{K}_{Id},$$

where $\gamma_{Pd}, \gamma_D, \gamma_{Id}>0$ are adaptation gains for proportional, derivative, and integral gains, respectively and $L_{Pd}, L_D, L_{Id}\geq$ are filter gains used to adjust an adaptation response for the adaptive gains.

15. The apparatus of claim 5, in which the adaptive parallel PID control command is $$u_a=\hat{K}_I(\int edt+\hat{K}_{Pi}e+\hat{K}_{Di}\dot{e}),$$

where $\hat{K}_I$ is an adaptive integral gain, $\hat{K}_{Di}$ is an adaptive derivative gain scaled by the adaptive integral gain, $\hat{K}_{Pi}$ is an adaptive proportional gain scaled by the adaptive integral gain.

16. The apparatus of claim 15, in which the adaptive gains are updated according to $$\dot{\hat{K}}_{Pi} = -\gamma_{Pi}\frac{\hat{K}_I}{2}ez - L_{Pi}\hat{K}_{Pi}$$

$$\dot{\hat{K}}_{Di} = -\gamma_{Di}\frac{\hat{K}_I}{2}\dot{e}z - L_{Di}\hat{K}_{Di}$$

$$\dot{\hat{K}}_I = -\gamma_I\left(\int edt + \frac{\hat{K}_{Pi}}{2}e + \frac{\hat{K}_{Di}}{2}\dot{e}\right)z - L_I\hat{K}_I,$$

where $\gamma_P, \gamma_D, \gamma_I>0$ are adaptation gains for proportional, derivative, and integral gains, respectively and $L_{Pi}, L_{Di}, L_I\geq$ are filter gains used to adjust an adaptation response for the adaptive gains.

17. The apparatus of claim 1, in which the adaptive parallel controller compensates for unknown and varying system parameters, wherein the varying system parameters include stiffness and inertia of the controlled system.

18. A method for controlling a system, comprising the steps of:

producing a fixed controller output comprising a fixed proportional-integral-derivative (PID) a fixed feedforward controller command from a reference command;

producing an adaptive controller output comprising an adaptive parallel PID and an adaptive feedforward command from the reference command; and adding the fixed controller output and the adaptive controller output to produce a control command for a controlled system providing a measure of an output and a rate of change of the output as feedback for the producing steps, in which gains of the adaptive parallel controller and the adaptive feedforward controller are adjusted dynamically.

19. The method of claim 18, in which the adaptive controller output is produced in parallel.

\* \* \* \* \*